US009538621B2

(12) United States Patent
Juslén et al.

(10) Patent No.: US 9,538,621 B2
(45) Date of Patent: Jan. 3, 2017

(54) LEARNING LUMINAIRE AND A LEARNING CONTROL DEVICE FOR A LUMINAIRE

(71) Applicant: Helvar Oy Ab, Karkkila (FI)

(72) Inventors: Henri Juslén, Kerava (FI); Max Björkgren, Kirkkonummi (FI)

(73) Assignee: Helvar Oy AB, Karkkila (FI)

( * ) Notice: Subject to any disclaimer, the term of this patent is extended or adjusted under 35 U.S.C. 154(b) by 0 days.

(21) Appl. No.: 14/640,769

(22) Filed: Mar. 6, 2015

(65) Prior Publication Data

US 2015/0264781 A1    Sep. 17, 2015

(30) Foreign Application Priority Data

Mar. 11, 2014   (EP) .................................... 14158856

(51) Int. Cl.
*H05B 41/285*   (2006.01)
*H05B 37/02*    (2006.01)

(52) U.S. Cl.
CPC ...... *H05B 37/0272* (2013.01); *H05B 37/0218* (2013.01); *H05B 37/0227* (2013.01); *H05B 37/0281* (2013.01)

(58) Field of Classification Search
CPC .......... G06F 1/26; H04L 12/12; H04L 12/282; H04L 2012/2841; H04L 2012/285; G01N 2035/00326; G01N 2035/00495; G01N 35/0092; G01N 35/00; G01N 21/6428; G01N 2021/6441; G01N 21/07; G01N 30/88; G01N 33/50; G01N 35/1065; G01N 35/1072; G01N 1/40; G01N 1/4077
See application file for complete search history.

(56) References Cited

U.S. PATENT DOCUMENTS

2014/0180487 A1*   6/2014   Bull ........................ H04L 12/12
                                                                 700/295

\* cited by examiner

*Primary Examiner* — Monica C King
(74) *Attorney, Agent, or Firm* — Harrington & Smith

(57) ABSTRACT

A technique for controlling a luminaire using a controller preprogrammed to cause the luminaire to carry out a predefined action as a response to an occurrence of a predefined triggering condition is provided. The technique comprises storing, into a memory, status indications received in the status indication messages from the other devices, analyzing the stored status indications in an attempt to identify a sequence of one or more status indications that repeatedly precede an occurrence of said predefined triggering condition, and reprogramming, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

18 Claims, 5 Drawing Sheets

LEARNING LUMINAIRE AND A LEARNING CONTROL DEVICE FOR A LUMINAIRE

FIELD OF THE INVENTION

The example embodiments of the present invention relate to automatically adapting operation of a luminaire in accordance with information received from other luminaires and other devices and/or with information obtained from its environment.

BACKGROUND OF THE INVENTION

There are luminaires and their control devices available that are provided with preprogrammed automated control functions that aim to make such luminaires suitable for a particular use in an environment of particular characteristics. Examples of such automated control functions include switching the lights on or off or controlling the light intensity level in response to information obtained from a sensor or from a timer. Quite obviously automated control functions typically applicable for a luminaire intended for indoor are quite different from those applicable for a luminaire intended for outdoor use. Similarly, automated control functions typically applicable for domestic use are likely different from those applicable to industrial use or to use in public buildings. Hence, different usage environments call for differently configured preprogrammed automated control functions.

However, although tailored to a particular use to some extent, such luminaires and their control devices are nevertheless limited in their operation to 'standard' solutions that aim to account for typical characteristics of the usage environment of the intended use, and therefore in many cases they fail to properly match the characteristics of their actual usage environment.

Enabling preprogramming of the automated control functions e.g. upon installation of the luminaire facilitates adapting a luminaires to account for particular requirements and/or characteristics of their usage environment to some extent. While such luminaires may enable improved flexibility in adaptation to a specific usage environment in comparison to luminaires preprogram as part of the manufacturing process, the preprogramming upon installation still necessarily remains as a step that can only prepare for assumed characteristics of the usage environment, and consequently in many cases the actually encountered characteristics of the usage environment remain unaccounted for. Furthermore, manual configuration of the luminaire may be a complex or inconvenient task that is prone to misconfiguration—and that is anyway unable to react to any subsequent changes in characteristics of the usage environment.

SUMMARY OF THE INVENTION

It is an object of the present invention to provide a technique that facilitates a luminaire automatically and autonomously adapting its preprogrammed operation in response to information obtained from its operating environment.

The object(s) of the invention are reached by a control device for a luminaire, a luminaire, by a method and by a computer program as defined by the respective independent claims.

According to a first aspect of the invention, a control device of a luminaire is provided. The control device comprises a controller for controlling operation of the luminaire, the controller preprogrammed to cause the luminaire to carry out a predefined action as a response to an occurrence of a predefined triggering condition, a communicator part for wireless communication with other devices, the communicator part configured to receive status indication messages from the other devices, and an adaptation part for adjusting the operation of the controller in accordance with received status indication messages, the adaptation part. The adaptation part is configured to store, into a memory, status indications received in the status indication messages from the other devices, analyze the stored status indications in an attempt to identify a sequence of one or more status indications that repeatedly precede an occurrence of said predefined triggering condition, and reprogram, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

According to a second aspect of the invention, a luminaire comprising a control device according to the first aspect of the invention is provided.

According to a third aspect of the invention, a method for operating a control device of a luminaire is provided, where the control device comprises a controller for controlling operation of the luminaire, the controller preprogrammed to cause the luminaire to carry out a predefined action as a response to an occurrence of a predefined triggering condition and a communicator part for wireless communication with other devices, the communicator part configured to receive status indication messages from the other devices. The method comprises storing, into a memory, status indications received in the status indication messages from the other devices, analyzing the stored status indications in an attempt to identify a sequence of one or more status indications that repeatedly precede an occurrence of said predefined triggering condition, and reprogramming, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

According a fourth aspect of the invention, a computer program for operating a control device of a luminaire is provided, where the control device comprises a controller for controlling operation of the luminaire, the controller preprogrammed to cause the luminaire to carry out a predefined action as a response to an occurrence of a predefined triggering condition and a communicator part for wireless communication with other devices, the communicator part configured to receive status indication messages from the other devices. The computer program includes one or more sequences of one or more instructions which, when executed by one or more processors, cause the control device at least to store, into a memory, status indications received in the status indication messages from the other devices, analyze the stored status indications in an attempt to identify a sequence of one or more status indications that repeatedly precede an occurrence of said predefined triggering condition, and reprogram, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

The computer program according to the fourth aspect of the invention may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to the fifth aspect of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

DETAILED DESCRIPTION

Figure 1:
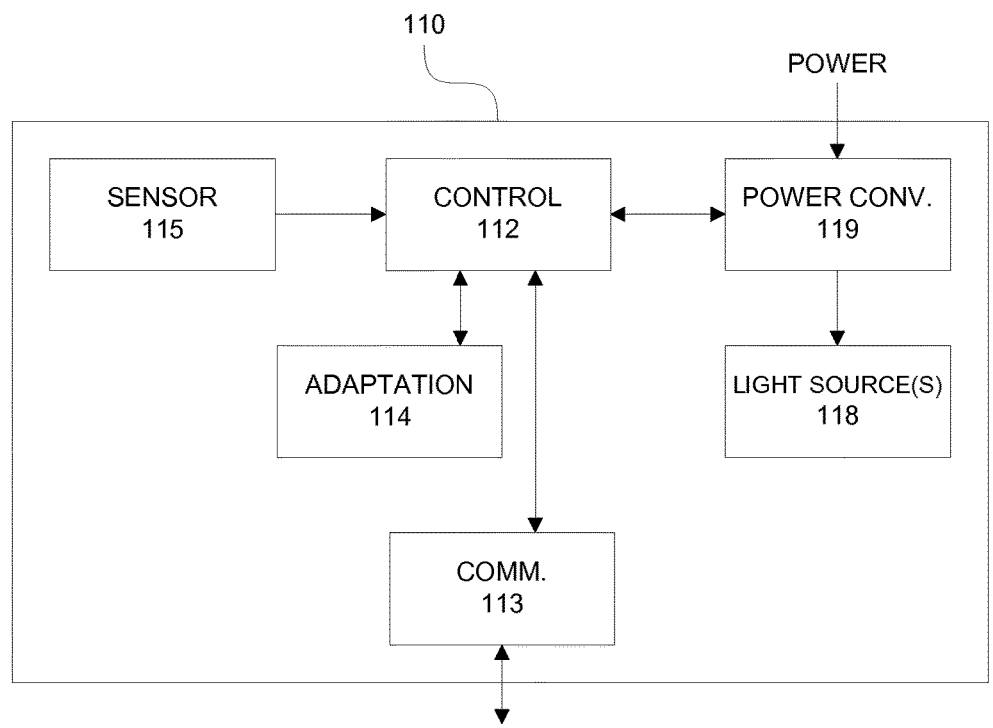
FIG. 1 schematically illustrates some components of a luminaire in accordance with an example embodiment.

FIG. 1 schematically illustrates some components of a luminaire 110. The luminaire 110 comprises a controller 112 for controlling operation of the luminaire. The luminaire 110 further comprises a communicator part 113 for communication with other devices. The luminaire 110 further comprises an adaptation part 114 for adapting the operation of the controller 112 based at least in part on basis of information received from other devices via the communicator part 113. These components of the luminaire 110 will be described in detail later in this text.

The luminaire further comprises e.g. one or more light sources 118 for providing the light output and a power converter portion 119 comprising one or more power converters for converting the operating power supplied to the luminaire 110 (e.g. from the mains electricity) into a format suitable for provision to the light source(s) 118. Details of operation of these components for various types of luminaires are well known in the art and they are not described herein.

The luminaire 110 further comprises a number of additional components not depicted in the schematic illustration of FIG. 1, e.g. a housing etc. Certain components, like for example those illustrated as blocks 112, 113, 114, 119, and possibly 115, may constitute a combined entity that is commonly referred to as a control device, which the luminaire manufacturer installs as a single unit into the luminaire. The control device may be, for example, a driver device for operating one or more light emitting diodes or an electronic ballast for operating a fluorescent lamp. The control device typically contains all (or at least a majority of) the programmable functionalities and intelligence that control the operation of the luminaire. Therefore, in the typical parlance of this technical field and—for clarity and brevity—also in this description it is said that the luminaire does this or comprises that, while actually it is the control device that comprises the described functionalities and/or is responsible for the described actions A plurality of the luminaires 110 may be arranged into a lighting system for illumination of an indoor space or an outdoor area. An indoor space may be e.g. a single room, a corridor, a number of rooms possible interlinked by one or more corridors, a floor of a building in its entirety, a building in its entirety, etc. An outdoor area may be e.g. a park, a parking lot, a residential neighborhood, a street or road, a part or combination of any of these, etc. In general, the space or area served by the lighting system is typically a space/area within which an occupant may move such that at any given time he/she is likely to need light output from only a limited subset of the luminaires of the lighting system. The space or area may also be defined as one where a number of occupants may need light output from all luminaires or a limited subset of luminaires depending on where they are and how they move within the space or area.

Referring back to luminaire 110 of FIG. 1, the controller 112 is typically arranged to control light output of the luminaire 110 on basis of information that is locally available in the luminaire 110. As an example, the control may include switching the light on/off or setting the light output to a certain light intensity level upon expiration of a timer. As another example, the control may include switching the light on/off or adjusting the light output to a certain light intensity level on basis of one or more environmental parameters observed locally at the luminaire 110. The control based on an environmental parameter may include switching the light on or off or setting a predefined light intensity level in response to the environmental parameter meeting a predefined condition.

As an example, an environmental parameter used as input by the controller 112 may be presence information obtained on basis of sensor data provided by an occupancy sensor arranged to monitor presence of one or more persons in an area or space served by the luminaire 110. Another example of an environmental parameter used as input by the controller 112 is a movement indication obtained on basis of sensor data provided by a motion sensor arranged to detect motion in the area or space served by the luminaire 110. A further example of an environmental parameter used as input by the controller 112 is a light level indication obtained on basis of sensor data provided by a light sensor arranged to measure the light level in the area or space served by the luminaire 110. As yet further examples, an environment parameter used as input by the controller 112 may be obtained on basis of sensor data provided by a crowd sensor (that detects the number of people on the monitored area/space), by a specialized motion sensor that detects direction of motion, by a sound sensor, by a temperature sensor, etc.

The occupancy sensor, the motion sensor, and/or the light sensor (and/or sensor(s) of other type(s)) may be provided in a sensor portion 115, which may be provided as part of the luminaire 110 as illustrated in FIG. 1, or as part of the control device of the luminaire. Alternatively, the sensor portion 115 may be provided separately from the luminaire 110 and its control device and it may be connected to the luminaire 110 or control device e.g. via a wired connection. As a generalization we may take the sensor portion 115 as a representative of all means through which the luminaire (or the control device) autonomously obtains information about environmental parameters. There may be one or more sensor portions of this kind in or at the disposal the luminaire 110.

The control of light output on basis of the presence information or on basis of the light level indication may comprise switching the light on, switching the light off and/or adjusting the light output level of the luminaire 110 to a predefined light intensity level. In this regard, the controller 112 may be preprogrammed to cause switching on the light in response to the presence information indicating a person entering the monitored area. The controller 112 may be further configured to cause switching off the light or adjusting the light output to a lower light intensity level after a continuous period of a predetermined duration during which the presence information does not indicate persons detected in the monitored area. As a further example, the controller 112 may be preprogrammed to cause adjusting the light output level of the luminaire 110 in accordance with the light level indication in order to bring a sum of the light output level and the ambient light level to a predefined target light level.

Herein, switching on the light serves as an example of a predefined action the control portion 112 is preprogrammed to carry out, whereas the indication regarding a person entering the monitored area serves as an example of a predefined triggering condition resulting in the predefined action. Similarly, switching off the light serves as another example of a predefined action the control portion 112 is preprogrammed to carry out, while the repeated (or continuous) indications regarding no persons having been detected in the monitored area serves as an example of the corresponding triggering condition. In general, the control portion 112 is preprogrammed to cause the luminaire to carry out a predefined action as a response to an occurrence of a respective predefined triggering condition. The control portion 112 may be preprogrammed to handle multiple pairs of a predefined triggering condition and a corresponding predefined action. Further examples of the predefined action and the predefined triggering condition that results in the predefined action to be carried out will be provided later in this text.

Table 1 provides illustrative and non-limiting examples of triggering conditions and corresponding actions the controller 112 may be preprogrammed to carry out.

TABLE 1

| # | Triggering condition | Action |
|---|---|---|
| 1 | Movement detected after a period of no movement | Switch the light on at a target light level $L_{tgt}$ |
| 2a | No movement detected after a period of detected movement | Start the timer to measure a waiting period of $T_1$ minutes |
| 2b | No movement detected for $T_1$ minutes | Switch the light off |
| 3a | No movement detected after a period of detected movement | Start the timer to measure waiting periods of $T_1$ and $T_2$ minutes |
| 3b | No movement detected for $T_2$ minutes | Adjust the light level to L % light intensity (where $L < L_{tgt}$) |
| 3c | No movement detected for $T_1$ minutes (where $T_1 > T_2$) | Switch the light off |
| 4a | Measured light level more than margin M below the target light level $L_{tgt}$ | Increase the light level (and/or switch the light on) to meet the target light level $L_{tgt}$ |
| 4b | Measured light level more than margin M above the target light level $L_{tgt}$ | Decrease the light level (or switch the light off) to meet the target light level $L_{tgt}$ |

The examples of the preprogrammed operation of the controller 112 described in the foregoing relate to a predefined action that comprises adjusting or changing the light output of the luminaire 110 and a corresponding predefined triggering condition that is at least partly based on evaluating an environmental parameter. However, the preprogrammed operation of the luminaire 110 may include, additionally or alternatively, predefined actions that relate to other aspect(s) of operation of the luminaire 110 and/or predefined triggering conditions that are evaluated using input different from an environmental parameter. Examples of such actions include waking up a processor from a sleep mode (e.g. from a power-saving mode) and increasing or decreasing a frequency of reading the output from a sensor, whereas examples of such triggering conditions include receiving an external command and detecting the expiration of a predetermined time limit, such as the typical 100 hours in-burning time of fluorescent tubes.

The communicator part 113 is configured to at least receive luminaire status indication messages from other luminaires and preferably also to transmit (e.g. broadcast) luminaire status indication messages to other luminaires. The luminaire status indication messages are arranged to carry information at least regarding the operational status of the transmitting luminaire and preferably also regarding identity of the transmitting luminaire (as will be described in more detail later in this text). The communicator part may comprise a wireless transceiver capable of communicating with other luminaires using a wireless communication technique or protocol. The wireless communication may be provided by using a suitable short-range wireless communication technique known in the art that enables communication over ranges from a few meters up to a few hundred meters, i.e. across the area or space illuminated using the lighting system. Examples of suitable wireless communication techniques include Bluetooth, Bluetooth Low-Energy, ZigBee, WLAN/Wi-Fi according to a IEEE 802.11 standard, etc. Further examples include infrared communications and other non-radio-based short-range communication techniques. The choice of the short-range wireless communication for a specific embodiment of the lighting system may depend e.g. on the required communication range and/or requirements with respect to energy-efficiency of the communicator part. Instead of or in addition to employing the wireless connection, wired connections between the luminaire 110 and other luminaires of the lighting system may be applied.

The controller 112 may be arranged to cause the communicator part 113 to transmit a status indication message in response to an occurrence of one of the predefined triggering conditions. Alternatively or additionally, the controller 112 may be arranged to cause the communicator part 113 to transmit a status indication message according to a predefined schedule, for example at regular time intervals (e.g. at one minute intervals).

A luminaire status indication message received from another luminaire or from other device at the luminaire 110 or a luminaire status indication message transmitted by the luminaire 110 comprises at least the following status information element:
- A status/value indication, e.g. an indication of the status or the value of an environmental parameter observed in the luminaire or other device transmitting the message (e.g. the presence indication status and/or the measured light level).

The luminaire status indication message may further comprise one or more of the following information elements:
- A luminaire (or other device) identification, e.g. an identifier assigned for the luminaire transmitting the message; alternatively or additionally an identifier of a device group to which the device transmitting the message belongs;
- An action indication, e.g. an indication of the action, if any, taken by the device transmitting the message in response to the indicated status or value of the environmental parameter;
- A light intensity indication, e.g. an indication of a new (upcoming) light intensity level to be employed by the luminaire transmitting the message and/or an indication of an upcoming change in the light intensity level by the luminaire transmitting the message.

The adaptation part 114 is configured to keep track of the information received in the luminaire status indication messages from other luminaires by storing the relevant information elements into a memory of the luminaire 110. Without losing generality, this collection of information stored in the memory may be referred to as a remote status information table. In this regard, some or all of the status information elements received in a message are stored, preferably together with timing indication indicating the time of their reception at the luminaire 110 as a single entry of the remote status information table. An entry of the remote status information table may also be referred to simply as a status indication. The information elements of a status message stored in the remote status information database comprise at least the status/value indication and preferably also the identification of the luminaire/device transmitting the message.

In parallel with keeping track of the received status indications from the other luminaires, the adaptation part 114 is further configured to keep track of occurrences of one or more predefined triggering conditions evaluated locally in the luminaire 110. The tracked conditions may involve, for example, at least some of the exemplifying triggering conditions described in Table 1. Without losing generality, this collection of information may be referred to as a local status information table. A single entry of the local status information table comprises an identification of the occurred a triggering condition, preferably together with timing indication indicating the time of its occurrence.

The timing indication stored in the status information tables may include a timestamp indicating the time elapsed since a predetermined reference point (e.g. as a number of clock ticks, as a number of (milli)seconds, etc.). The timing indication may additionally include an indication of the time of the day, e.g. the wall-clock time as hours, minutes, seconds and fractions of a second (depending on the desired accuracy of this aspect of the timing indication).

The adaptation part 114 is further configured to analyze the status indications stored in the remote status information table in view of the information stored in the local status information table in an attempt to identify a sequence of one or more status indications that repeatedly precede the occurrence of a given predefined triggering condition. The adaptation part 114 is further configured to reprogram, in response to detecting such a repeated pattern of received status indications preceding a given triggering condition, the controller 112 to cause the luminaire 110 to initiate carrying out the corresponding predefined action in response to reception of the identified sequence of status indications.

In the following, the analysis is outlined for a single predefined triggering condition. In case the controller 112 is preprogrammed to implement a plurality of pairs of triggering condition and predefined action, similar analysis may be carried out for each of the triggering conditions.

- The analysis pertaining to a given triggering condition may be initiated in response to the triggering condition having occurred at least a predetermined number of times since the most recent analysis for this triggering condition. As another example, the analysis may be initiated at predetermined time intervals.
- The analysis may comprise searching a predefined sequence of status indication messages (e.g. one that has been identified in an earlier analysis pertaining to the given triggering condition or one that can be expected to occur for some other reason), or the analysis may comprise searching for any repeated sequence of status indication messages.
- The search may attempt to find a sequence of a predetermined number (one or more) of status indications or to find a sequence of at most a predetermined number (one or more) of status indications.
- The analysis for each occurrence of the given triggering condition may consider the status indications that have occurred within a predefined time period preceding the respective occurrence of the given triggering condition. In other words, the analysis window may include all status indications received with a time period of interest. Alternatively, the analysis window may include a predetermined number of status indications most recently received before the respective occurrence of the given triggering condition.
- For identification of a repeatedly occurring status indication, the analysis considers similarity of at least one of the status/value indication, the action indication and the light intensity indication, and preferably also the transmitting device identification. Two status indications are treated as similar in case their information elements considered in the similarity evaluation are found to be similar.
- If included in the timing information, the analysis may further take into account similarity in the time of the day of occurrence in similarity evaluation of status indications. This facilitates considering e.g. sequences of (otherwise similar) status indications occurring during working hours as separate from those occurring during the evening/night time—and consequently enables different reprogramming for the working hours and the evening/night time.
- For identification of a repeatedly occurring sequence of status indications, the analysis may consider two candidate sets of status indications preceding respective separate occurrences of the given triggering condition to represent occurrences of the same sequence in accordance with one of the following conditions:
  - if the same set of status indications are found to occur in both candidate sets within the analysis window in any order (in this case the output of the analysis, if successful, is the list of status indications);

if the same set of status indications are found to occur in both candidate sets within the analysis window in the same order (in this case the output of the analysis, if successful, is the list of status indications and their order in the sequence);

if the same set of status indications are found to occur in both candidate sets with the analysis window in the same order with similar or essentially similar time differences to the respective occurrence of the given triggering condition, and hence with similar or essentially similar time differences between status indications of the respective candidate set (in this case the output of the analysis, if successful, is the list of status indications, their order in the sequence, and timing of the status indications in the sequence with respect to the occurrence of the triggering condition).

The analysis may consider an identified sequence to repeatedly precede the occurrence of the triggering condition in response to at least a predefined percentage (e.g. 80 or 90%) of the occurrences of the triggering condition having been found to follow the identified sequence, possibly with an additional condition that at least a predefined number (e.g. N≥20) of occurrences of the given triggering condition have been considered in identification of the repeatedly occurring sequence.

In addition to or instead of automated initiation of the analysis, the analysis may be initiated, for example, due to a request from an external control entity (e.g. in response to a user action). An example of such a control entity include a (wired) control device connected or coupled via wired connection(s) to the luminaire 110 and other luminaires of the lighting system employing the luminaire 110. Another example in this regard is a wireless control entity (e.g. a remote controller) arranged to enable transmission of the request via the (wireless) communicator part 113.

Reprogramming the controller 112 may comprise replacing the preprogrammed triggering condition with a condition that requires reception of the identified sequence of status indications, thereby causing the controller to cause carrying out the respective predefined action as a response to the sequence of status indications. This corresponds to replacing the preprogrammed locally evaluated triggering condition with remotely or collectively evaluated triggering condition.

Alternatively, reprogramming the controller 112 may comprise using the original predefined triggering condition and a condition that requires reception of the identified sequence of status indications in parallel. This may be provided e.g. such that reception of the sequence of status indications results in the controller 112 invoking preparatory action(s) that precede execution of the predefined action and facilitate timely execution of the predefined action, whereas occurrence of the preprogrammed triggering condition continues to result in the controller 112 causing the luminaire to carry out the predefined action. This corresponds to initiating the preparatory action on basis of remotely or collectively evaluated triggering condition while continuing to trigger the respective predefined action in response to the preprogrammed locally evaluated triggering condition. Examples of such preparatory actions include waking up one or more components of the luminaire 110 (e.g. a processor) from a power-saving mode (a 'sleep mode') to anticipate switching the light on in response to an occurrence of the triggering condition, switching the light on at a low light intensity level to anticipate switching the light on at the target light level (which is typically a high light intensity level) in response to an occurrence of the triggering condition;

preliminarily adjusting the light output by a certain fraction of the amount by which it would be adjusted in response to a sole occurrence of the predefined triggering condition;

increasing the rate at which an environmental parameter is obtained on basis of sensor data to facilitate timely detection of an occurrence of a triggering condition that involves evaluation of a value of an environmental parameter, and increasing the activation or reporting frequency of a sensor of the sensor portion 115 to facilitate timely detection of an occurrence of a predefined triggering condition that involves evaluation of a value of an environmental parameter.

When applying the identified sequence of received status indications as a triggering condition instead of or in parallel with the preprogrammed one, the controller 112 is arranged to apply the same criteria as was applied in the analysis/search carried out to identify the sequence (status indications in any order, status indications in a certain order, status indications in a certain order at certain time differences in relation to each other) in evaluating the match between the identified sequence of status indications serving as the (reprogrammed triggering condition) and a sequence the received sequence of status indications.

Figure 2:
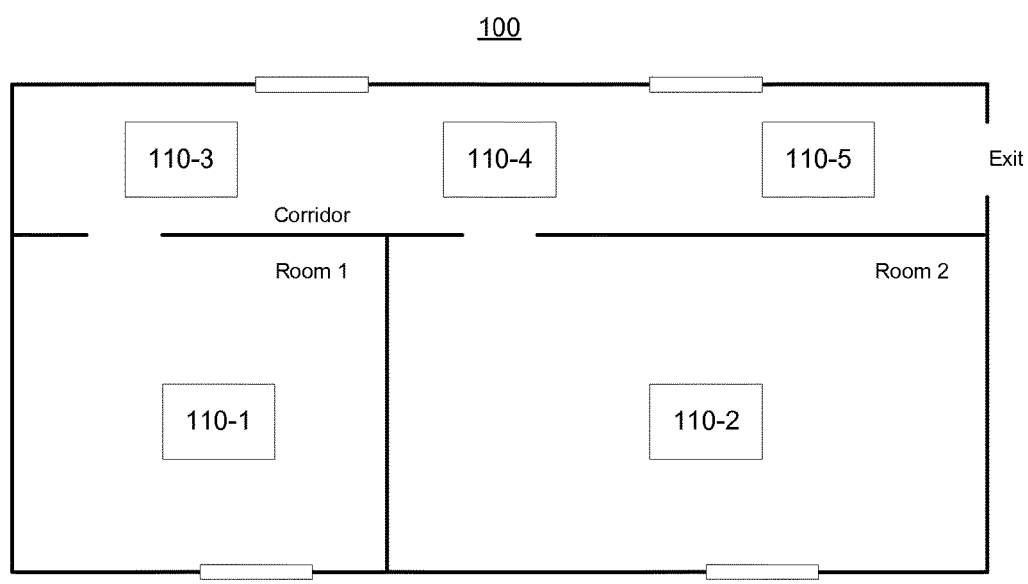
FIG. 2 schematically illustrates some components of an exemplifying lighting system.

FIG. 2 schematically illustrates some components of an exemplifying lighting system 100, serving as a framework for description of some aspects of operation of the luminaire 110 and for description of further examples or variations of the luminaire 110. The bold lines of FIG. 2 illustrate an exemplifying floor plan of a building that divides the indoor space served by the lighting system 100 into two rooms (labeled as "Room 1" and "Room 2") and a corridor linking the rooms to an exit (labeled as "Exit"). Moreover, the white rectangles superimposed on the bold lines indicate positions of windows. The lighting system comprises luminaires 110-1 to 110-5 with the luminaire 110-1 arranged to serve the Room 1, with the luminaire 110-2 arranged to serve the Room 2, and with the luminaires 110-3, 110-4 and 110-5 are arranged to serve respective areas of the corridor. In the following, for brevity of description, the set of luminaires 110-1 to 110-5 is jointly referred to as luminaires 110-$x$, whereas the subset of luminaires 110-2 to 110-5 is jointly referred to as luminaires 110-$y$. Each of the luminaires 110-$x$ corresponds to the luminaire 110 described in the foregoing.

In context of the lighting system 100, the luminaires 110-$x$ are arranged to employ respective sensor portions 115 comprising at least a motion sensor arranged to detect motion in the area or space served by the respective luminaire 110-$x$. Moreover, the controller 112 in the luminaires 110-$x$ may be preprogrammed to apply the triggering conditions and the corresponding actions 1, 2$a$ and 2$b$ of the Table 1, in view of the movement indications received from their respective motion sensors, i.e.

| # | Triggering condition | Action |
|---|---|---|
| 1 | Movement detected after a period of no movement | Switch the light on at a target light level $L_{tgt}$ |
| 2a | No movement detected after a period of detected movement | Start the timer to measure a waiting period of $T_1$ minutes |

-continued

| # | Triggering condition | Action |
|---|---|---|
| 2b | No movement detected for $T_1$ minutes | Switch the light off |

The communicator part 113 of the luminaires 110-$x$ may be arranged to apply short-range wireless communication to receive luminaire status indication messages from the other luminaires 110-$x$ of the lighting system 100 and to broadcast luminaire status indication messages to the other luminaires 110-$x$ of the lighting system 100. The luminaires 110-$x$ may be arranged to transmit luminaire status indication messages including the following information elements in response to an occurrence of one of the triggering conditions 1, 2a or 2b:
  An identifier serving as the luminaire identification;
  A movement indication (movement detected/no movement detected) as a status indication;
  An indication of the light being switched on or off as an action indication.

The luminaire 110-$x$ that locally encounters an occurrence of a triggering condition complements/updates its local status information table accordingly, whereas the other luminaires 110-$x$ of the lighting system complement/update their remote status information tables accordingly upon reception of the luminaire status indication message reporting the occurrence of the triggering condition.

If considering a scenario where the luminaire 110-1 receives a following sequence of luminaire status indication messages while itself failing to detect any movement:
  "Movement detected" (due to occurrence of the triggering condition 1) from the luminaire 110-4, and
  "Movement detected" (due to occurrence of the triggering condition 1) from the luminaire 110-3,
it is highly likely that the person moving in the corridor is on his/her way to Room 1 and the next step in the chain of events is that the (local) motion sensor of the luminaire 110-1 issuing a motion indication indicating the person entering the space served by the luminaire 110-1, thereby triggering the preprogrammed action of switching on the light due to the triggering condition 1.

After repeated occurrences of such chain of events, the operation of the adaptation part 114 in the luminaire 110-1 identifies the repeated sequence of luminaire status indication messages from the luminaires 110-4 and 110-3 (in this order) to repeatedly precede the occurrence of the triggering condition 1 in the luminaire 110-1 and, consequently, proceed to reprogram the luminaire 110-1 to switch on the light at the target light level $L_{tgt}$ already in response to receiving the above-mentioned sequence of luminaire status indications instead of waiting for the preprogrammed triggering condition 1 to occur. This new triggering condition may replace the triggering condition 1 or it may be used as an additional triggering condition to cause action 1.

As a variation of such learning behavior, the identification of repeated occurrence of the above-described sequence of status indications from luminaires 110-4 and 110-3 may result in the adaptation part 114 in the luminaire 110-1 reprogramming the luminaire 110-1 to switch on the light at a lower level (at a level significantly lower than the target light level $L_{tgt}$) in response to receiving the above-mentioned sequence while continuing the preprogrammed operation of switching on the light at the target light level $L_{tgt}$ in response to occurrence of the preprogrammed triggering condition 1.

Along similar lines, e.g. the luminaire 110-3 may detect a repeated sequence of luminaire status indication messages from the luminaires 110-5 and 110-4 (in this order) or from the luminaires 110-2 and 110-4 (in this order) indicating that movement has been has been detected to precede occurrence of the triggering condition 1 and hence the analyzer part 114 in the luminaire 110-3 may reprogram the luminaire 110-3 to switch on the light at the target light level $L_{tgt}$ or at a lower level already in response to detecting an occurrence of either of the above-mentioned sequences of status indications.

It is worth noticing that the luminaire 110-1 does not need to know the locations of the luminaires 110-$y$ in order to successfully carry out the reprogramming operation but it is sufficient to identify the chain of events (i.e. the sequence of luminaire status indication messages) that repeatedly precedes the occurrence of the triggering condition 1.

If considering a scenario where the luminaire 110-1 has encountered the triggering condition 2a but has not yet encountered the triggering condition 2b, i.e. the waiting period of $T_1$ minutes before switching the light off is on its way, and further that the luminaire 110-1 repeatedly receives a following sequence of luminaire status indication messages:
  "No movement detected after a period of detected movement" (due to occurrence of the triggering condition 2a) from the luminaire 110-2,
  "Movement detected" (due to occurrence of the triggering condition 1) from the luminaire 110-4,
  "Movement detected" (due to occurrence of the triggering condition 1) from the luminaire 110-5,
  "No movement detected after a period of detected movement" (due to occurrence of the triggering condition 2a) from the luminaire 110-4,
  "No movement detected after a period of detected movement" (due to occurrence of the triggering condition 2a) from the luminaire 110-5,
it is highly likely that the person moving from Room 2 via the corridor towards the Exit has actually exited the space and there is likely no need for further illumination.

Consequently, the operation of the adaptation portion 114 in the luminaire 110-1 identifies the repeated sequence of luminaire status indication messages from the luminaires 110-2, 110-4 and 110-5 to repeatedly precede the occurrence of the triggering condition 2b in the luminaire 110-1 and reprograms the luminaire 110-1 e.g. to switch the light off immediately or essentially immediately or after a waiting period that is (significantly) shorter than $T_1$ minutes. This new triggering condition may replace the triggering condition 2b or it may be used as an additional triggering condition to cause action 2b.

As a variation of the previous example scenario, the controller 112 in the luminaires 110-$x$ may be additionally configured to transmit luminaire status indication messages at regular intervals (e.g. at intervals of one minute). If considering a scenario where the luminaire 110-1 has encountered the triggering condition 2a but has not yet encountered the triggering condition 2b, i.e. the waiting period of $T_1$ minutes before switching the light off is on its way, and further that the luminaire 110-1 repeatedly receives the status indication messages reporting that "No movement detected after a period of detected movement" (due to occurrence of the triggering condition 2a or in a scheduled status indication message) from all other luminaires 110-$y$, it is highly likely that there are no persons occupying the space served by the lighting system.

Consequently, the operation of the adaptation portion 114 in the luminaire 110-1 identifies the repeated sequence of luminaire status indication messages from the other luminaires 110-y to repeatedly precede the occurrence of the triggering condition 2b in the luminaire 110-1 and reprograms the luminaire 110-1 e.g. to switch the light off immediately or essentially immediately upon receiving the above-mentioned sequence of luminaire status indications or after a waiting period that is (significantly) shorter than $T_1$ minutes. This new triggering condition may replace the triggering condition 2b or it may be used as an additional triggering condition to cause action 2b.

As a further example scenario, the sensor portions 115 in the luminaires 100-x of the lighting system 100 further comprise respective light sensors arranged to measure the light level in the area or space served by the luminaire 110-x. Moreover, the controller 112 in the luminaires 110-x may be further preprogrammed to apply the triggering conditions and the corresponding actions 4a and 4b of the Table 1, in view of the light level indications received from their respective light sensors, i.e.

| # | Triggering condition | Action |
|---|---|---|
| 4a | Measured light level more than margin M below the target light level $L_{tgt}$ | Increase the light level (and/or switch the light on) to meet the target light level $L_{tgt}$ |
| 4b | Measured light level more than margin M above the target light level $L_{tgt}$ | Decrease the light level (or switch the light off) to meet the target light level $L_{tgt}$ |

In addition to the luminaire status indication messages of a type described above (in the introduction of the lighting system 100), the luminaires 110-x may be arranged to transmit luminaire status indication messages including the following information elements in response to an occurrence of one of the triggering conditions 4a, 4b:

An identifier serving as the luminaire identification;
A light level indication (observed light level at the luminaire 110-x transmitting the message) as a status indication;
An indication of an upcoming change in the light intensity level of the luminaire 110-x transmitting the message) as a light intensity indication.

If considering a scenario where the other luminaires receive from the luminaire 110-5 a following luminaire status indication message:

"Decreasing light intensity from 80% to 45%" (due to occurrence of the triggering condition 4b), with no luminaire status indication messages related to changes in light intensity level from other luminaires 110-x, it is highly likely that an external source of ambient light e.g. through the window is affecting the observed light intensity in the area/space served by the luminaire 110-5. Some of the light emitted by the luminaire 110-5 may reach to the areas served by the other luminaires, so that when the luminaire 110-5 now decreases its light intensity, at least some of the other luminaires may detect a decrease in their measured local light intensity. In a disadvantageous case they could start increasing their light intensity, which would trigger a further decrease in the luminaire 110-5; in a particularly disadvantageous case the light intensities of a number of luminaires could enter a self-sustained oscillating sequence. In order to avoid misguided decisions regarding the appropriate light intensity level, the other luminaires 110-x who received the above-mentioned status indication message from luminaire 110-5 preferably refrain from taking any action that would adjust their light intensity levels until the luminaire 110-5 is done with implementing the light output level change.

However, since the effect of ambient light may be more pronounced for the luminaire 110-5 than e.g. for the luminaire 110-4, the luminaire 110-4 may repeatedly detect, after the luminaire 110-5 has implemented the above-mentioned change in its light intensity, that there is a need to increase the light output of the luminaire 110-4 by K % to follow the target light level $L_{tgt}$. Consequently, the operation of the adaptation portion 114 in the luminaire 110-4 may identify an occurrence of the above-mentioned luminaire status indication messages from the luminaire 110-5 to repeatedly precede the occurrence of the triggering condition 4b in the luminaire 110-1 to require increase the light intensity level by K %, which may result in reprogramming of the luminaire 110-5 e.g. to increase its light output level by K % already as a response to the above-mentioned luminaire status indication message from the luminaire 110-5 to avoid temporarily compromising the illumination level.

Figure 3:
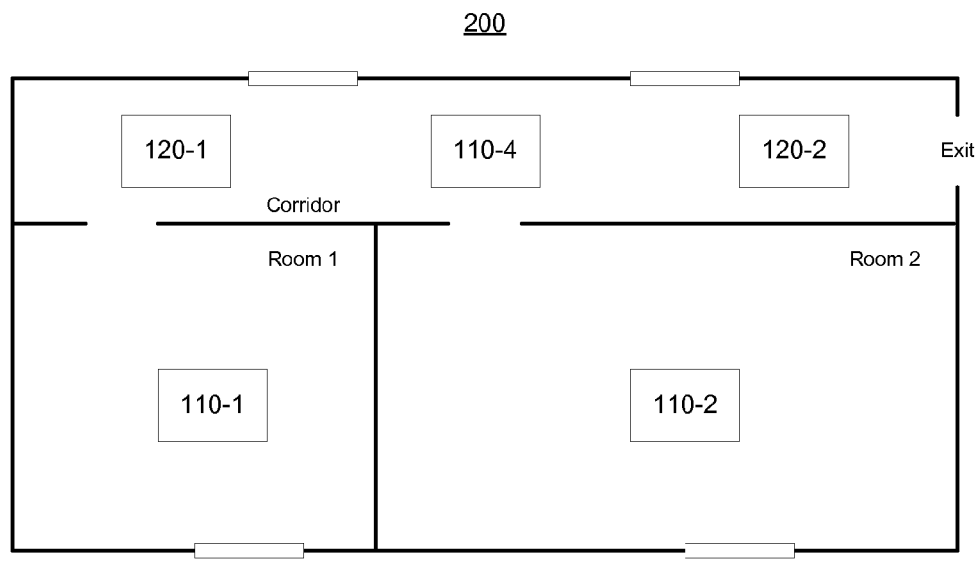
FIG. 3 schematically illustrates some components of an exemplifying lighting system.

FIG. 3 schematically illustrates some components of an exemplifying lighting system 200, serving as another framework for description of some aspects of operation of the luminaire 110 and for description of further examples or variations of the luminaire 110. The lighting system 200 is a variation of the lighting system 100 with the following high-level differences:

A single luminaire 110-4 is employed to serve the corridor,
The lighting system 200 further comprises sensor units 120-1 and 120-2.

Each of the sensor units comprises at least a controller for controlling operation of the respective sensor unit 120-1, 120-2 and a sensor portion comprising at least a motion sensor arranged to detect motion in the respective area or space of interest. Each of the sensor units 120-1, 120-2 further comprises a communicator part (e.g. a wireless transmitter or a wireless transceiver) for transmitting sensor data to other devices in proximity of the respective sensor unit 120-1, 120-2 in sensor status indication messages.

The sensor units 120-1, 120-2 may configured to transmit a sensor status indication message according to a predefined schedule, for example at regular intervals (e.g. at an interval in the range from 1 to 10 seconds). Alternatively or additionally, the sensor units 120-1, 120-2 may be configured to transmit a sensor status indication message in response to a change in the status of the monitored area/space (e.g. "movement detected after a period of no movement" and/or "no movement detected after a period of detected movement"). A sensor status indication message comprises at least a status/value indication (e.g. an indication of the status or the value of an environmental parameter observed in the sensor transmitting the message) and preferably also a sensor unit identification (e.g. an identifier assigned for the respective sensor unit 120-1, 120-2 transmitting the message).

Hence, the sensor units 120-1, 120-2 may serve as shared sensor devices that may provide sensor data to one or more luminaires 110-x of the lighting system 200. In addition to motion sensor(s), the sensor units 120-1, 120-2 may, alternatively or additionally, comprise sensors of other type (e.g. occupancy sensor(s), light sensor(s), . . . ) for provision to one or more luminaires 110-x of the lighting system 200.

As in case of the exemplifying lighting system 100, also in the lighting system 200 each of the luminaires 110-x corresponds to the luminaire 110 described in the foregoing. However, herein the luminaires 110-x may further receive, vie their communicator part 113, the sensor status indication messages from one or more sensor units 120-1, 120-2. Therefore, the luminaires 110-x are further configured to store the information elements received in the sensor status indication message together with timing indication that indicates the time of their reception at the luminaire 110 as a single entry of the remote status information table. Consequently, the adaptation part 114 considers also the information received from the sensor units 120-1, 120-2 in the analysis aiming to identify a sequence of one or more status indications that repeatedly precede the occurrence of a given predefined the triggering condition.

Despite employing (motion) sensors provided in the dedicated sensor units 120-1, 120-2, the operation of the lighting arrangement with respect to the 200 is mostly similar with that of the lighting arrangement 100. However, the dedicated sensor portion 115 of the luminaire 110-4 may be omitted and the luminaire 110-4 may receive the sensor data applied by the controller 112 in the sensor status indication messages. Moreover, the status indication messages received at the luminaires 110-1 and 110-2 now originate from the sensor units 120-1, 120-2 instead of the luminaires 110-3 and 110-5 of the lighting system 100. However, the operation of the adaptation part 114 in the luminaires 110-x remains essentially unchanged, although it now (also) considers status indications originating from sensor units 120-1, 120-2.

Changes in the overall configuration of the lighting system, or changes in the purpose to which the space or area served by lighting system is used, or other factors may cause the need to reset some or all of the luminaires back to their preprogrammed condition. It is advantageous to equip the luminaires with a controllable reset function, which a user can trigger e.g. by flicking a switch, pressing a button, sending a control command, or giving some exceptional input to a sensor. Resetting may take place also automatically after a certain period of time, in order to ensure that the luminaire is not stuck to following some operating patterns that it learned earlier but that are not actual any more. An alternative to complete resetting is rolling back, in which a most recent (and possibly also most complicated) reprogramming is cancelled and replaced with an earlier version of reprogrammed operation.

Reprogramming should not mean completely overwriting a preprogrammed way of operating. For example, if a luminaire was preprogrammed to switch on the light to 100% upon detecting movement (an example of the triggering condition 1 in Table 1) and subsequently reprogrammed to switch on the light to 100% upon receiving a particular sequence of status indication messages from other luminaires, it should still switch on the light to 100% upon detecting movement even if it did not receive said sequence of status indication messages. In other words, the preprogrammed "standalone" operating mode preferably overrides the reprogrammed functions, except possibly in some special case where it is considered advantageous to definitely replace the preprogrammed function with a reprogrammed one.

One possible status indication message which a luminaire may transmit is an announcement that it has performed a particular operation in response to receiving a status indication message from another luminaire. This may lead to so-called second-level learning, meaning that a luminaire may learn, what kind of predefined actions other luminaires have learned to carry out in response to status indication messages transmitted to them. As an example, in the lighting system of FIG. 2 the luminaire 110-5 may learn that after itself and luminaire 110-4 have transmitted consecutive status indication messages about detected motion, typically luminaire 110-2 also transmits a status indication message where it announces having reacted to the two preceding status indication messages, and then maintains its light level at 100% for at least two hours. This means that a lone person entering the building typically goes to Room 2 and stays there for a relatively long time. Even if luminaires 110-4 and 110-5 do not detect movement during that time, it could be advantageous if they would learn to keep their lights on at least some dimmed level as long as lights remain on in Room 2, so that the person in Room 2 would see his possible escape route at least dimly illuminated.

Figure 4:
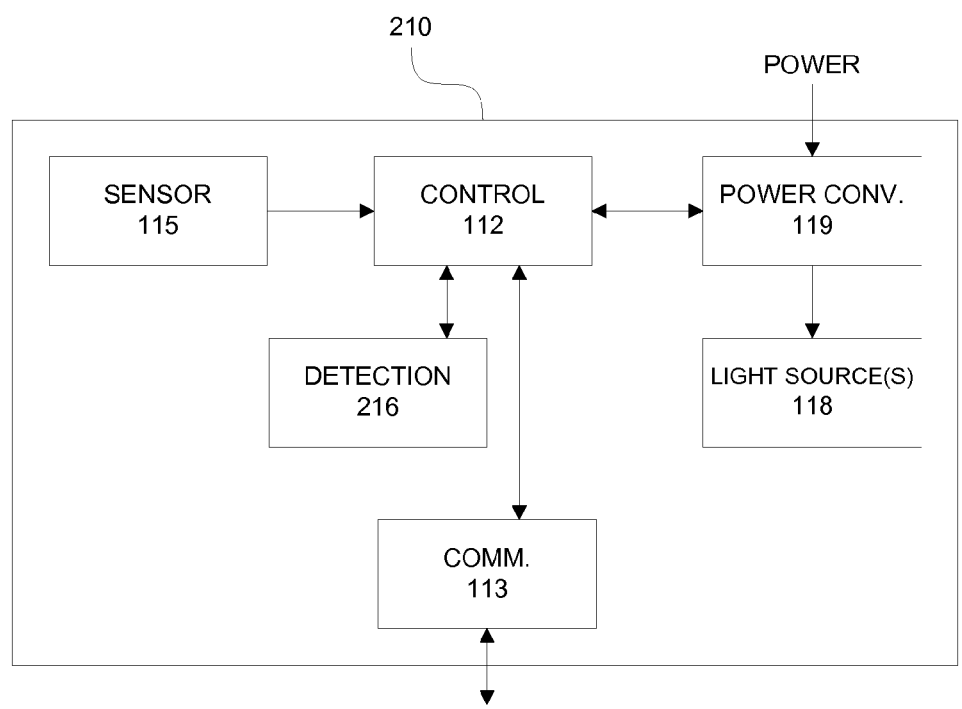
FIG. 4 schematically illustrates some components of a luminaire in accordance with an example embodiment.

FIG. 4 schematically illustrates some components of the luminaire 210. The luminaire 210 comprises the controller 112 and the communicator part 113 described in the foregoing in context of the luminaire 110. The luminaire 210 further comprises a detector part 216 for identifying other luminaires in proximity of the luminaire 210. The luminaire 210 further comprises the sensor portion 115 comprising at least a light sensor arranged to measure the light level in the area or space served by the luminaire 210.

Figure 5:
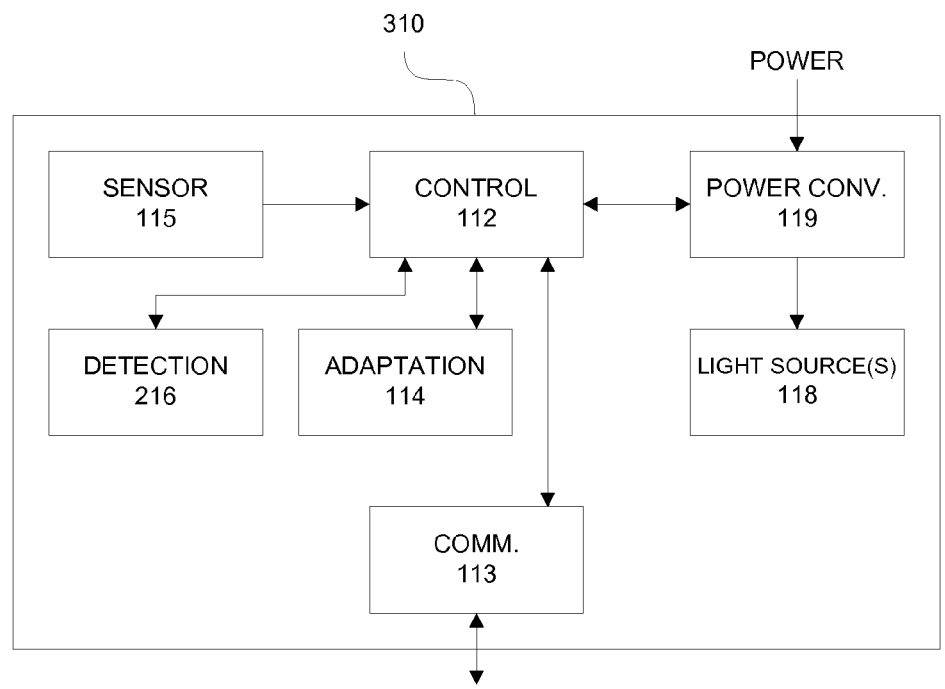
FIG. 5 schematically illustrates some components of a luminaire in accordance with an example embodiment.

FIG. 5 schematically illustrates some components of the luminaire 310. The luminaire is similar to the luminaire 110 but it further comprises the detector part 216. The luminaire 310 includes also the sensor portion 115 comprising at least a light sensor arranged to measure the light level in the area or space served by the luminaire 310.

The detector part 216 is configured to carry out a neighborhood detection procedure, which may be invoked upon installation, configuration or reconfiguration of the luminaire 210, 310 or a lighting system making use of the luminaire 210, 310. The neighborhood detection procedure may be invoked or activated via an external control entity in response to a user action. Examples of such a control entity include the wired and wireless control devices referred to in context of description of the luminaire 110.

Instead of invoking the neighborhood detection process in response to an explicit request by a user, the external control entity may be configured to automatically invoke the detection process. An instance of automatic invocation may be carried out according a predefined schedule, for example at regular intervals (e.g. at intervals of a few days, a few weeks, a few months, . . . ). Additionally, each instance may involve a single run of the neighborhood detection process or it may involve a series of runs repeated at different times of the day to ensure that e.g. the sunlight does not interfere with the detection process. Furthermore, a precondition for automatic invocation of the neighborhood detection procedure may be that none of the luminaires 210, 310 has detected movement for a period of $T_n$ minutes. One advantage of such a possible precondition is the avoidance of unnecessary irritation to occupants: since the neighborhood detection procedure involves repeated changes in light levels for neighborhood detection purposes, occupants of the area served by the lighting system could experience it as a disturbance.

Figure 6:
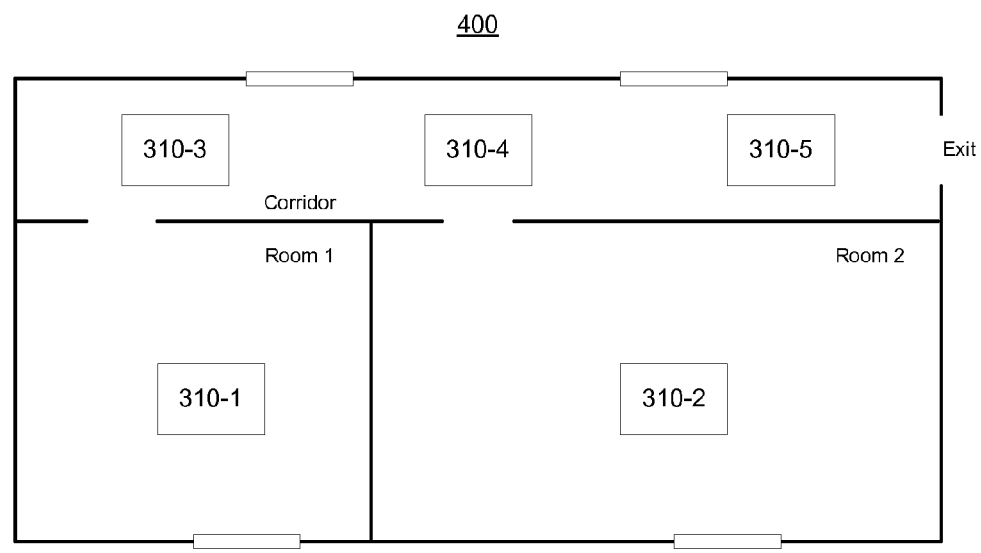
FIG. 6 schematically illustrates some components of an exemplifying lighting system.

The neighborhood detection procedure employs the light output of the luminaire 210 as a signal that may be measured by another luminaire and the light sensor of the sensor portion 115 to measure the signal. To provide a framework for describing this procedure, FIG. 6 schematically illustrates some components of an exemplifying lighting system 400 including the luminaires 310-1 to 310-5, each of which corresponds to the luminaire 310 or to the luminaire 210 described in the foregoing. The lighting system 400 is a variation of the lighting system 100 with the luminaires 110-x replaced with the respective luminaires 310-x.

In order to carry out the neighborhood detection procedure, the detector part 216 is configured to cause the control portion 112 to control the luminaire 310-*x* to vary the light output therefrom according to a predefined signaling sequence. Moreover, the detector part 216 is arranged to cause the communicator part 113 to transmit an announcement message regarding execution of the signaling sequence before commencing the execution of light output level variation according to the signaling sequence. The signaling sequence may be commenced immediately or essentially immediately after transmission of the announcement message. Alternatively, the signaling sequence may be commenced after a delay period following the transmission of the announcement message. The announcement message comprises at least a luminaire identification (e.g. an identifier assigned for the luminaire 310-*x* transmitting the announcement). The announcement message may further provide information that specifies the applied signaling sequence and/or its duration. The announcement message may further comprise an indication of the delay period between the announcement message and the signaling sequence.

The predefined signaling sequence may comprise changing the light intensity between a high level and a low level according to a predetermined pattern, for example,

- changing the light intensity of the luminaire 310-*x* from 100% light intensity to 0% and back to 100% within a predefined time period (e.g. 10 seconds);
- changing the light intensity of the luminaire 310-*x* from 0% light intensity to 100% and back to 0% within the predefined time period;
- repeatedly changing the light intensity of the luminaire 310-*x* between 100% and 0% for (at least) a predetermined number of times.

The percentages 100% and 0% are given above as examples, and any or both of them could be replaced with some other percentage.

Moreover, the detector part 216 is arranged, in response to detecting the announcement message from another luminaire 310-*x*, to continuously observe and record the light level indications from the light sensor for a period that covers the duration of the signaling sequence (possibly extended by a safety margin to make sure that the signaling sequence in full is captured). The sequences of light level indications so acquired are stored in a memory of the luminaire 310-*x* together with the luminaire identification received in the announcement message preceding the signaling sequence.

After receiving the request to invoke the neighborhood detection procedure, each luminaire 310-*x* of the lighting system 200 may be configured to initiate execution of the signaling sequence after a random time period following the invocation request. A single run of the neighborhood detection procedure is completed when all luminaires 310-*x* of the lighting system have executed the signaling sequence. After one or more runs of the neighborhood detection procedure, the detector part 216 at each of the luminaires 310-*x* is arranged to analyze the observed light levels.

The analysis, at a given luminaire 310-*x* may comprise identifying the stored sequences of observed light levels that are captured on basis of signaling sequences from a certain other luminaire 310-*x* and computing the average value over the identified sequences. The identification process is repeated for all other luminaires 310-*x*, and the decreasing order of the averaged values defines the ranking order of the other luminaires 310-*x*. Since the amplitude of change in the observed light level can be assumed to decrease with increasing distance between two luminaires 310-*x*, and even the brightest observed light level can be assumed to decrease, the ranking order that is based on the decreasing average observed light level and/or the decreasing observed amplitude of change in the level at the same time indicates the increasing order of distances to the given luminaire 310-*x*.

As an example, with reference to FIG. 6, the neighborhood detection procedure may result in the luminaire 310-1 observing a rather pronounced amplitude of change in the level (and/or the average light level) on basis of the signaling sequence output by the luminaire 310-3, whereas the signaling sequences output from the luminaires 310-4 and 310-5 may result in observing a noticeable but significantly lower amplitude of change (or average) than that originating from the luminaire 310-3. Moreover, the signaling sequence output from the luminaire 310-2 may go completely unnoticed. Consequently, the ranking order may become e.g. 310-3, 310-4, 310-5 and 310-2.

As another example, the neighborhood detection procedure may result in the luminaire 310-4 observing a rather pronounced amplitude of change in the level (and/or the average light level) on basis of the signaling sequences output by the luminaires 310-4, 310-1 and 310-5, whereas the signaling sequence output from the luminaire 310-2 may result in observing a noticeable but significantly lower amplitude of change (or average) than that originating from the luminaire 310-3. Consequently, the ranking order may become e.g. 310-4, 310-1, 310-5 and 310-2.

The adaptation part 114 of the luminaire 310-*x* may be configured to carry out the analysis of the status indications stored in the remote status information table in view of the ranking order of the other luminaires 310-*x* of the lighting system 300. In the analysis carried out in a given luminaire 310-*x*, the ranking order (and/or the average observed light levels) may be applied with the aim of steering the analysis to concentrate on status indications received from those luminaires that are closest to the given luminaire 310-*x*—in other words to those luminaires that are most likely to see motion that is likely to continue towards the area/space served by the given luminaire 310-*x*. Alternatively or additionally, the analysis carried out in a given luminaire 310-*x*, the ranking order (and/or the average observed light levels) may be applied with the aim of steering the analysis to concentrate on status indications received from those luminaires that are in the same room or in a common space. It is very likely that such luminaires can be clearly recognized in the ranking order, because the change of light level of a luminaire in the same room will be observed much more clearly that the change of light level of a luminaire that is around a corner or in an adjacent space, with only a window or door opening letting some light through to the space where the analyzing luminaire is located.

Some examples in this regard are described in the following.

- In a given luminaire 310-*x*, the analysis may only consider (or give a higher emphasis to) status indications from (at most) a predetermined number of other luminaires 310-*x* in the top positions of the ranking order (i.e. the luminaires 310-*x* that are considered to be closest).
- In a given luminaire 310-*x*, the analysis may exclude from consideration (or give a lower emphasis to) status indications from any other luminaires 310-*x* that are below a predetermined position in the ranking order.
- In a given luminaire 310-*x*, the analysis may only consider (or give a higher emphasis to) status indications from those other luminaires for which the average observed light level or average amplitude of change during the signaling sequence (applied in the neighborhood detection procedure) is higher than a predefined percentage of the average observed light level or average amplitude of change for the top-ranked other luminaire 310-x.

In a given luminaire 310-x, the analysis may exclude from consideration (or give a lower emphasis to) those other luminaires 310-x for which the average observed light level or average amplitude of change during the signaling sequence is lower than a predefined percentage of the average observed light level or average amplitude of change for the top-ranked other luminaire 310-x.

In a given luminaire 310-x. the analysis may exclude from consideration (or give lower emphasis to) those other luminaires 310-x for which the average observed light level or average amplitude of change during the signaling sequence belongs to a clearly distinguishable lower category in the ranking order, indicating that those other luminaires are not in the same room or space.

In a given luminaire 310-x, a change in the ranking order in comparison to a ranking order determined earlier (e.g. in comparison to the most recently defined previous ranking order) may serve as an indication of a change in the environment of the given luminaire 310-x. In particular, a new luminaire identified in one of the top positions of the ranking order likely indicates a new luminaire having been installed in the lighting system 400, whereas a luminaire in one of the top positions in the earlier ranking order that is missing from the newly-determined ranking order likely indicates a malfunctioning luminaire or a luminaire that has been removed from the lighting system 400. The top positions may include a predefined number of positions in the beginning of the ranking order. Consequently, upon detecting such a change in the ranking order, the detection portion 216 of the given luminaire 310-x may be configured, for example, to reset all reprogrammed triggering conditions (and to restore the corresponding preprogrammed ones) and/or to schedule an analysis of the status indications in order to identify the repeated sequences to commence after a predefined period of time.

As a further variation of the luminaires 110, 210 and/or 310, the controller 112 may be further arranged to cause the communicator part 113 to relay (or forward) luminaire status indication messages received from other devices to one or more further luminaires or devices of other type. Relaying a message may comprise forwarding the received message to one or more specific luminaires and/or devices or broadcasting the message. The one or more specific luminaires/devices may be predetermined once. Alternatively, these luminaires/devices may be the ones that are closest to the luminaire 110, 210, 310. As an example, the luminaires/devices that are closest to the luminaire 210, 310 may be estimated e.g. based on the ranking order defined on basis the neighborhood detection procedure. As another example, the luminaires/devices that are closest to the luminaire 210, 310 may be estimated on basis of signal levels of the status indications received from the other luminaires/devices (e.g. by measuring and keeping a record of received signal strength indications (RSSI) of the messages received from luminaires/devices) and considering the luminaires/devices exhibiting highest signal levels as the closest ones. Such an approach enables delivering luminaire status indication messages also across lighting systems that spans over an area that exceeds the operating range of the employed wireless communication technique. Moreover, such message delivery approach also enables delivering e.g. control messages (originating e.g. from the external control entity) over the ad hoc network (e.g. a mesh network) provided by the luminaires 110, 210, 310 and/or other devices of the lighting system.

Figure 7:
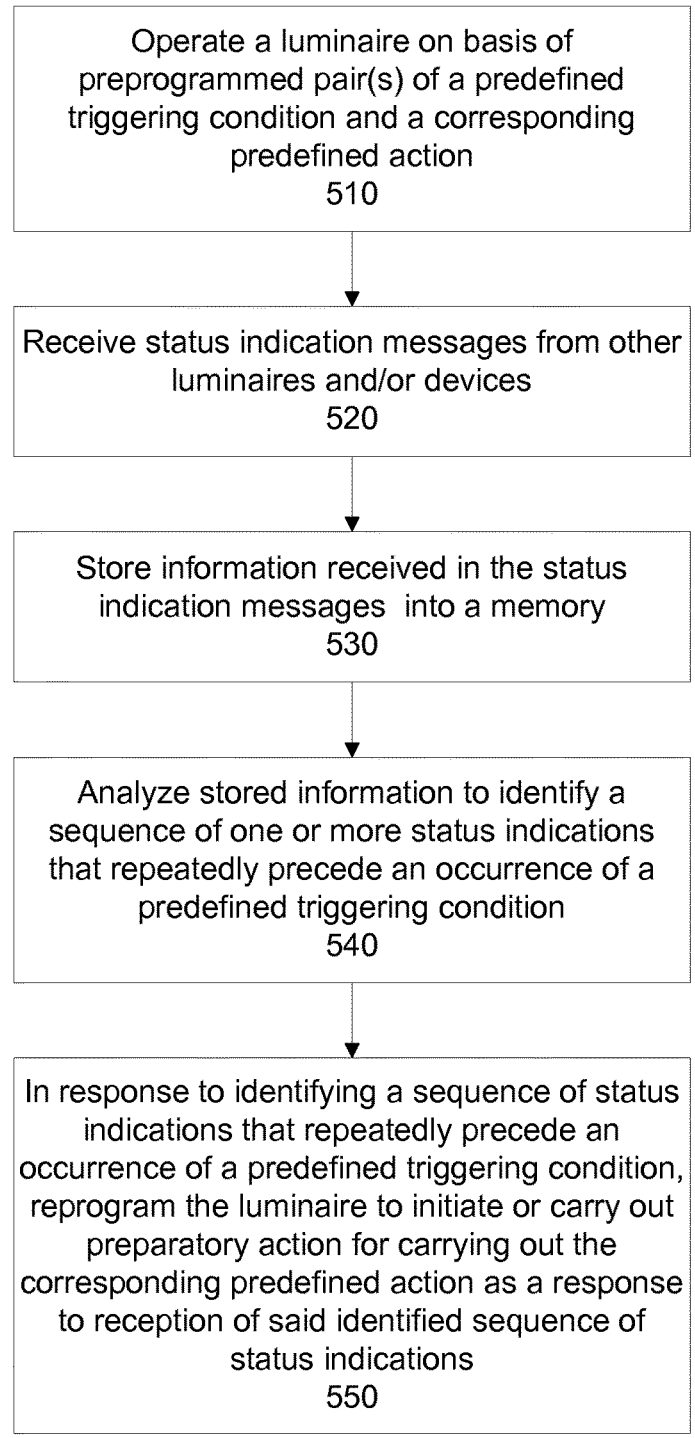
FIG. 7 depicts a flowchart illustrating an exemplifying method in accordance with an example embodiment.

FIG. 7 depicts a flowchart illustrating an exemplifying method 500 for carrying out operations, procedures, functions and/or methods described in the foregoing in context of the control device of the luminaire 110. The method 500 starts from operating the luminaire 110 on basis of the preprogrammed pair(s) of predefined triggering condition and corresponding predefined action to be invoked by the controller 112, as indicated in block 510. As described in the foregoing, this may involve initiating or carrying out the predefined action in response to an occurrence of the respective predefined triggering condition. The method 500 further comprises receiving the luminaire status indications from the other luminaires and/or from the other devices, as indicated in block 520.

The method 500 further comprises storing information received in the luminaire status indication messages into the memory, as indicated in block 530. The information may be stored in the remote status information table, as described in the foregoing. The method 500 further comprises analyzing the stored information in an attempt to identify a sequence of one or more status indications that repeatedly precede an occurrence of a predefined triggering condition, as indicated in block 540. The method 500 further comprises reprogramming the luminaire, in response to identifying a sequence of status indications that repeatedly precede an occurrence of a certain predefined triggering condition, to initiate carrying out said predefined action or carry out a preparatory action for carrying out said predefined action as a response to reception of said identified sequence of status indications, as indicated in block 550.

The method steps of blocks 510 to 550 may be varied in a number of ways, for example as described in the foregoing in context of (the control devices of) the luminaires 110, 210 and 310.

Figure 8:
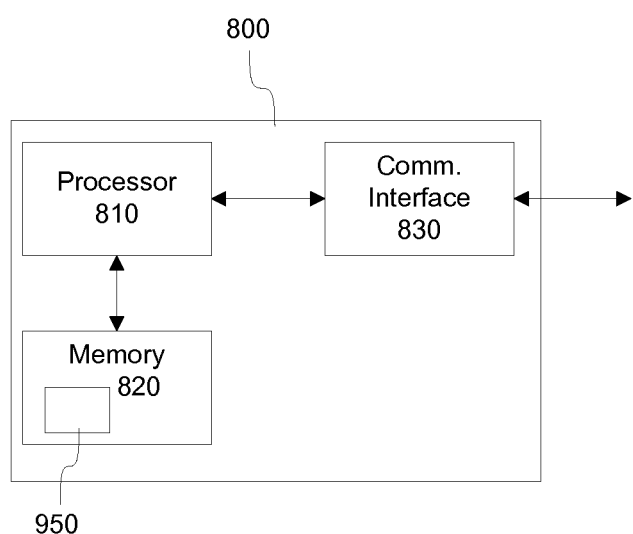
FIG. 8 schematically illustrates an apparatus 800 in accordance with an example embodiment.

FIG. 8 schematically illustrates an exemplifying apparatus 800 upon which an embodiment of the invention may be implemented. The apparatus 800 as illustrated in FIG. 8 provides a diagram of exemplary components of an apparatus, which is capable of operating as or providing at least the controller 110 together with one or both of the adaptation part 114 and the detector part 216. The apparatus 800 comprises a processor 810 and a memory 820. The processor 810 is configured to read from and write to the memory 820. The memory 820 may, for example, act as the memory for storing the remote status indication table and the local status indication table. The apparatus 800 further comprises a communication interface 830 for communication with other devices. The communication interface 830 may comprise the communicator part 113 or an interface between the processor 810 and the communicator part 113. The apparatus 800 may comprise further components not illustrated in the example of FIG. 8.

The memory 820 may store a computer program 850 comprising computer-executable instructions that control the operation of the apparatus 800 when loaded into the processor 810. As an example, the computer program 850 may include one or more sequences of one or more instructions. The computer program 850 may be provided as a computer program code. The processor 810 is able to load and execute the computer program 850 by reading the one or more sequences of one or more instructions included therein from the memory 820. The one or more sequences of one or more instructions may be configured to, when executed by the processor 810, cause the apparatus 800 to carry out operations, procedures and/or functions described hereinbefore in context of the controller 112 together with one or both of the adaptation part 114 and the detector part 216.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

We claim:

1. A control device of a luminaire comprising:
   a controller for controlling operation of the luminaire, the controller preprogrammed to cause the luminaire to carry out a predefined action as a response to an occurrence of a predefined triggering condition,
   a communicator part for wireless communication with other devices, the communicator part configured to receive status indication messages from the other devices, said status indication messages carrying information regarding operational status of the other devices, and
   an adaptation part for adjusting the operation of the controller in accordance with received status indication messages, the adaptation part configured to
      store, into a memory, status indications received in the status indication messages from the other devices,
      analyze the stored status indications in an attempt to identify a sequence of one or more status indications that repeatedly precede an occurrence of said predefined triggering condition, and
      reprogram, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

2. The control device according to claim 1, wherein the communicator part is configured to transmit status indication messages, and the controller is configured to cause the communicator part to transmit a status indication message in response to an occurrence of said predefined triggering condition.

3. The control device according to claim 2, wherein the controller is configured to cause the communicator part to transmit a status indication message according to a predetermined schedule.

4. The control device according to claim 1,
   wherein the predefined action comprises changing or adjusting the light output of the luminaire, and
   wherein the predefined triggering condition comprises an environmental parameter observed at the luminaire meeting a predefined condition.

5. The control device according to claim 1, wherein the status indication message comprises:
   a device identification that identifies the device transmitting the message, and
   a status indication that indicates the value of an environmental parameter observed in the device transmitting the message.

6. The control device according to claim 1, wherein the adaptation part is configured to consider two candidate sequences of status indications to represent two occurrences of the same sequence in response to said two candidate sequences including the same status indications.

7. The control device according to claim 1, wherein the adaptation part is configured to consider two candidate sequences of status indications to represent two occurrences the same sequence in response to said two candidate sequences including the same status indications in the same order.

8. The control device according to claim 1, wherein the adaptation part is configured to consider two candidate sequences of status indications to represent two occurrences the same sequence in response to said two candidate sequences including the same status indications in the same order and with similar or essentially similar time differences to the respective occurrence of said predefined triggering condition.

9. The control device according to claim 1, wherein the adaptation part is configured to consider a candidate sequence of status indications to be a repeatedly occurring one in response to at least a predetermined percentage of occurrences of said predefined triggering condition being preceded by the candidate sequence.

10. The control device according to claim 1, wherein the adaptation part is configured to reprogram the controller to cause the luminaire to carry out said predefined action as a response to reception of said identified sequence of status indications.

11. The control device according to claim 1, wherein the adaptation part is configured to reprogram the controller to:
    carry out a preparatory action that facilitates execution of the predefined action as a response to reception of said identified sequence of status indications, and
    carry out said predefined action as a response to an occurrence of a predefined triggering condition.

12. The control device according to claim 1, further comprising a detector part for detecting other luminaires in proximity of the luminaire, the detector part comprising
    a signaling part for outputting a signaling sequence during which the light output level from the luminaire as varied according to a predetermined pattern,
    an observation part for capturing the light level variations during the signaling sequence output from another luminaire, and
    an analyzer part for defining a ranking order of the other luminaires in proximity on basis of the captured light level variations.

13. The control device according to claim 12, wherein the signaling part is configured to:
    cause the communication portion to transmit an announcement message indicating a beginning of said signaling sequence, wherein the announcement message comprises a luminaire identification that identifies the luminaire, and
    cause the luminaire to vary the light output level from the luminaire according to said predetermined pattern.

14. A control device according to claim 12, wherein the observation part is configured to:

receive an announcement message indicating a beginning of said signaling sequence, wherein the announcement message comprises a luminaire identification that identifies the luminaire, capture, by a light sensor, a sequence of light level indications during said signaling sequence that follows said announcement message, store, into the memory, said luminaire identification together with the captured sequence of light level indications, and analyze the stored sequences of light level indications captured on basis of signaling sequences output from a plurality of other luminaires to determine a ranking order therebetween as a decreasing average light level of the sequence.

15. The control device according to claim 12, wherein the adaptation part is configured to analyze the stored status indications in view of the determined ranking order.

16. A luminaire comprising a control device according to claim 1.

17. A method for operating a control device of a luminaire, the control device comprising:

a controller for controlling operation of the luminaire, the controller preprogrammed to cause the luminaire to carry out a predefined action as a response to an occurrence of a predefined triggering condition, and a communicator part for wireless communication with other devices, the communicator part configured to receive status indication messages from the other devices, said status indication messages carrying information regarding operational status of the other devices, the method comprising:

storing, into a memory, status indications received in the status indication messages from the other devices, analyzing the stored status indications in an attempt to identify a sequence of one or more status indications that repeatedly precede an occurrence of said predefined triggering condition, and reprogramming, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

18. A non-transitory memory storing a computer program for operating a control device of a luminaire, the control device comprising:

a controller for controlling operation of the luminaire, the controller preprogrammed to cause the luminaire to carry out a predefined action as a response to an occurrence of a predefined triggering condition, and a communicator part for wireless communication with other devices, the communicator part configured to receive status indication messages from the other devices, said status indication messages carrying information regarding operational status of the other devices, the computer program including one or more sequences of one or more instructions which, when executed by one or more hardware processors, cause the control device to at least perform the following:

store, into the memory, status indications received in the status indication messages from the other devices, analyze the stored status indications in an attempt to identify a sequence of one or more status indications that repeatedly precede an occurrence of said predefined triggering condition, and reprogram, in response to identifying a sequence of status indications that repeatedly precede an occurrence of said predefined triggering condition, the controller to cause the luminaire to initiate or to carry out a preparatory action for carrying out said predefined action as a response to reception of said identified sequence of status indications.

* * * * *